United States Patent [19]

Moro et al.

[11] Patent Number: 5,075,803
[45] Date of Patent: Dec. 24, 1991

[54] SIGNAL DISCRIMINATING DEVICE FOR VTR HAVING EXPANDED DYNAMIC RANGE

[75] Inventors: Eiji Moro, Katsuta; Hitoshi Akamine, Takasaki; Hiroyuki Torii, Katsuta; Kuniaki Miura, Ibaraki, all of Japan

[73] Assignee: Hitachi, Ltd., Tokyo, Japan

[21] Appl. No.: 333,901

[22] Filed: Apr. 6, 1989

[30] Foreign Application Priority Data

Apr. 6, 1988 [JP] Japan ................... 63-82915

[51] Int. Cl.⁵ .............................................. G11B 5/02
[52] U.S. Cl. ...................................... 360/27; 360/67
[58] Field of Search ................. 360/27, 25, 65, 67, 360/33.1

[56] References Cited

U.S. PATENT DOCUMENTS 4,786,986 11/1988 Yamanushi et al. ............ 360/33.1

FOREIGN PATENT DOCUMENTS 154221 11/1965 European Pat. Off. .
265930A2 4/1988 European Pat. Off. .
287682 10/1988 European Pat. Off. .
335655 4/1989 European Pat. Off. .

*Primary Examiner*—Vincent P. Caney
*Attorney, Agent, or Firm*—Antonelli, Terry, Stout & Kraus

[57] ABSTRACT

A magnetic recording and reproducing apparatus having a first recording mode and a second recording mode in which a luminance signal of a video signal is converted into FM luminance signal related to a first carrier frequency and to a second carrier frequency so as to be recorded on a magnetic tape includes a discriminating device or discriminating a recording mode in which an FM luminance signal reproduced from a magnetic tape so as to be supplied to a playback circuit has been recorded. The signal discriminating device includes an automatic gain control (AGC) circuit for absorbing a dispersion of the reproduced signal, a discrimiating circuit having a first band-pass filter and a second band-pass filter for processing an output from the AGC circuit so as to discriminate the first and second modes, a detecting circuut to which the reproduced signal is supplied in a parallel fashion with respect to the AGC circuit such that an amplitude of the signal is detected and is then compared with a predetermined value so as to obtain noise information, and a latch circuit for latching an output from the discriminating circuit such that in response to the noise information from the detecting circuit, a previous value of the outpt from the discriminating circuit is held, thus producing a discrimination output of the discriminating device.

8 Claims, 6 Drawing Sheets

AGC CHARACTERISTIC

DISCRIMINATION CHARACTERISTIC

T1 : OUTPUT HOLD PERIOD

T2 : DISCRIMINATION OPERATION PERIOD

SIGNAL DISCRIMINATING DEVICE FOR VTR HAVING EXPANDED DYNAMIC RANGE

BACKGROUND OF THE INVENTION

The present invention relates to a signal discriminating device having a function to classify input signals supplied thereto based on a spectrum of the signal as information for discrimination, and in particular, to a signal discriminating device suitable for an automatic discrimination of a playback mode of a video tape recorder (VTR) such as one represented by an S-VHS-VTR having two systems of FM standards.

A signal discriminating circuit device of this kind has been described, for example, as a constitution in pages 24 to 27 of a Japanese article "Television Technology", August '87, and such a known technology has been disclosed in the U.S. Pat. No. 4,786,986 assigned to the present assignee (block 12, FIGS. 7-10).

FIG. 7 shows an example the conventional device described in the Japanese article above. The signal discriminating device develops, as represented by the S-VHS-VTR, a signal discriminating function in a VTR having two kinds of FM standards in an FM luminance signal processing such that a difference between reproduced FM signal spectra is detected so as to output a high level or a low level depending on a mode determined by the detection. Description will next be given of a case where the circuit device is applied to the S-VHS-VTR.

In FIG. 7, an input signal is a playback or reproduced FM signal. In the recording and playback processes, the high-frequency output is generally lowered. In consequence, there is provided a peaking circuit 2 to correct the decrease in the high-frequency output, and in general, the peaking circuit 2 is adjusted to develop a peaking characteristic associated with the peaking frequency $f_p \approx 7$ to 8 MHz. A reproduced FM signal corrected by the peaking circuit 2 passes through an amplifier 10 and is then supplied to an S-VHS-band-pass filter (BPF) 11 and a VHS-band-pass filter (BPF) 12. FIG. 3 shows an example of the characteristics of these two band-pass filters 11 and 12.

Let us consider the case where the reproduced FM signal is associated with the S-VHS mode. Since the FM allocation in the S-VHS mode is defined as the top of synchronization = 5.4 MHz and the white peak = 7.0 MHz, the output amplitude of the S-VHS-BPF 11 becomes greater than that of the VHS-BPF 12. As a result, the output direct-current (DC) potential of a smoothing circuit 13 is higher than that of a smoothing circuit 14.

On the other hand, in a case where the reproduced FM signal is associated to the VHS mode. Since the FM allocation is defined as the top of synchronization = 3.4 MHz and the white peak = 4.4 MHz, the output DC potential of the smoothing circuit 14 becomes greater than that of the smoothing circuit 13. In this configuration, a comparator 15 effects a compare operation among three input DC potential values. When the output DC potential of the smoothing circuit 13 takes the highest value, the output from a hold controller 17 indicates the S-VHS mode (let us assume here the output is at a high level in this case). When the output DC potential of the smoothing circuit 14 takes the highest value, the output from a hold controller 17 is set to a lower level and hence indicates the VHS mode. When a reference potential 16 separately set takes the highest value, the previous value of the output from the hold controller 17 is kept unchanged. FIG. 8 shows a hold control characteristic of the output mode of the hold controller 17 when the amplitude and frequency of the input signal to the amplifier 10 are changed. In FIG. 8, in a range of the amplitude of the input signal not exceeding 100 mVpp, the value of the output mode is kept unchanged. That is, the range is a dead zone for the input signal. The width of the amplitude dead zone can be arbitrarily set by changing the value of the reference potential 16. When the reproduced FM signal has a small amplitude, a wrong discrimination is likely to occur due to noise and an external disturbance; however, the erroneous discrimination can be prevented by appropriately setting the amplitude dead zone as described above.

In the technology above, in each circuit constituting the amplifier 10, the S-VHS-BPF 11, and the VHS-BPF 12, there exists a dynamic range; in consequence, also for the overall signal discriminating device, there exists a dynamic range for the input signal amplitude in which an appropriate discriminating operation can be achieved. On the other hand, due to causes such as a deviation in the tape head system and a dispersion or unevenness in the gain of the playback preamplifier, the amplitude dispersion of the reproduced FM signal becomes quite large, and hence there exists a fear that the dynamic range of the signal discriminating device is easily exceeded.

In the hold control circuit 17, the previous value of the discrimination output is generally held in a form of an electric charge by use of a capacitor. In consequence, the leakage of the charge cannot be avoided, and in order to prevent the effect thereof, it is necessary to increase the size and capacity of the capacitor. In this case, however, the value of the time constant increases and hence the response speed of the circuit is lowered, which leads to a problem in the practical operation. The discriminating device according to the U.S. Patent above also employs a capacitor to hold the signal and hence is attended with the similar problem.

SUMMARY OF THE INVENTION

It is therefore an object of the present invention to provide a signal discriminating device in which a dynamic range thereof is expanded so as to effect a correct discriminating operation in a range of an amplitude dispersion of a reproduced FM signal.

Another object of the present invention is to provide an automatic playback mode discriminating device formed in an integrated circuit (IC) which has a large dynamic range so as to prevent a wrong discrimination due to an amplitude deviation of a reproduced FM signal of a VTR.

According to a feature of the present invention, there is provided a signal discriminating device including a discriminating circuit, an automatic gain control (AGC) circuit for setting an amplitude of an input signal to a constant value and for expanding a dynamic range of the signal discriminating circuit, said signal discriminating circuit being coupled to the output of said AGC circuit, a latch circuit connected to an output from said signal discriminating circuit so as to develop a function to keep a previous value of a discrimination output, and an amplitude detecting circuit for detecting a magnitude of an amplitude of the input signal prior to said AGC circuit such that the reliability of the discriminating operation is improved by controlling the latch circuit based on an output from the amplitude detecting circuit as noise information.

In the AGC circuit, the gain of the amplifier is automatically changed to set the output amplitude to a fixed value. In other words, when an input signal has a small amplitude, the amplification gain is increased; whereas, for a large amplitude of the input signal, the amplification gain is decreased, so that the output amplitude is held at a fixed value for a broad range of the amplitude of the input signal namely, the dynamic range is expanded. A range of the input signal in which the amplitude of the AGC output signal is kept at a fixed value will be referred to as an AGC dynamic range herebelow.

When the AGC dynamic range is set to be wider as compared with the range of the dispersion in the reproduced FM signal, the amplitude of the input signal received by the signal descriminating device is not subjected to the influence caused by the dispersion of the reproduced FM signal, and hence there is attained an FM signal having substantially a constant amplitude. By setting the amplitude to a value appropriate for a signal discrimination, it is possible to avoid incorrect discrimination associated with the deviation of the amplitude of the reproduced FM signal.

On the other hand, however, in the case where the input signal to the AGC circuit does not include any signal component, namely, only a noise is inputted, a noise is amplified by the AGC circuit so as to be fed to the signal discriminating circuit, which may easily lead to an incorrect discrimination. In order to avoid the erroneous discrimination, the amplitude of the signal not having passed through the AGC circuit is detected to effect a comparison between the detected amplitude and a threshold value separately set. The threshold value is established such that a large input amplitude is assumed for an ordinary signal input and that a small input amplitude is assumed for a noise input and for an input of quite a small signal associated with a large deterioration of the signal-to-noise ratio. By using noise information judged in association with the threshold value thus determined, a control operation is achieved on the latch circuit disposed on the output side of the signal discriminating circuit. When the input amplitude is assumed to be large, the latch circuit is set to the signal-through state, whereas when the input amplitude is assumed to be small, the latch circuit is caused to effect a hold operation to hold the previous output value. As a result, for an input of a noise, the previous output value is kept held for the discrimination output, and hence an incorrect discrimination is prevented.

In the signal discriminating device according to the present invention, the input signal dynamic range in which a stable discriminating is possible can be set to a very large value, and the output hold operation to hold the output in a case of an input of quite a small signal is provided to prevent the erroneous discrimination in a special playback operation or the like, in consequence, there can be implemented a signal discriminating device developing a high performance.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Description will now be given of an embodiment in which the present invention is applied to a reproducing system of an S-VHS-VTR with reference to FIG. 1A. The overall constitution of a VTR of this type is also as shown in the U.S. Patent described above.

Figure 1A:
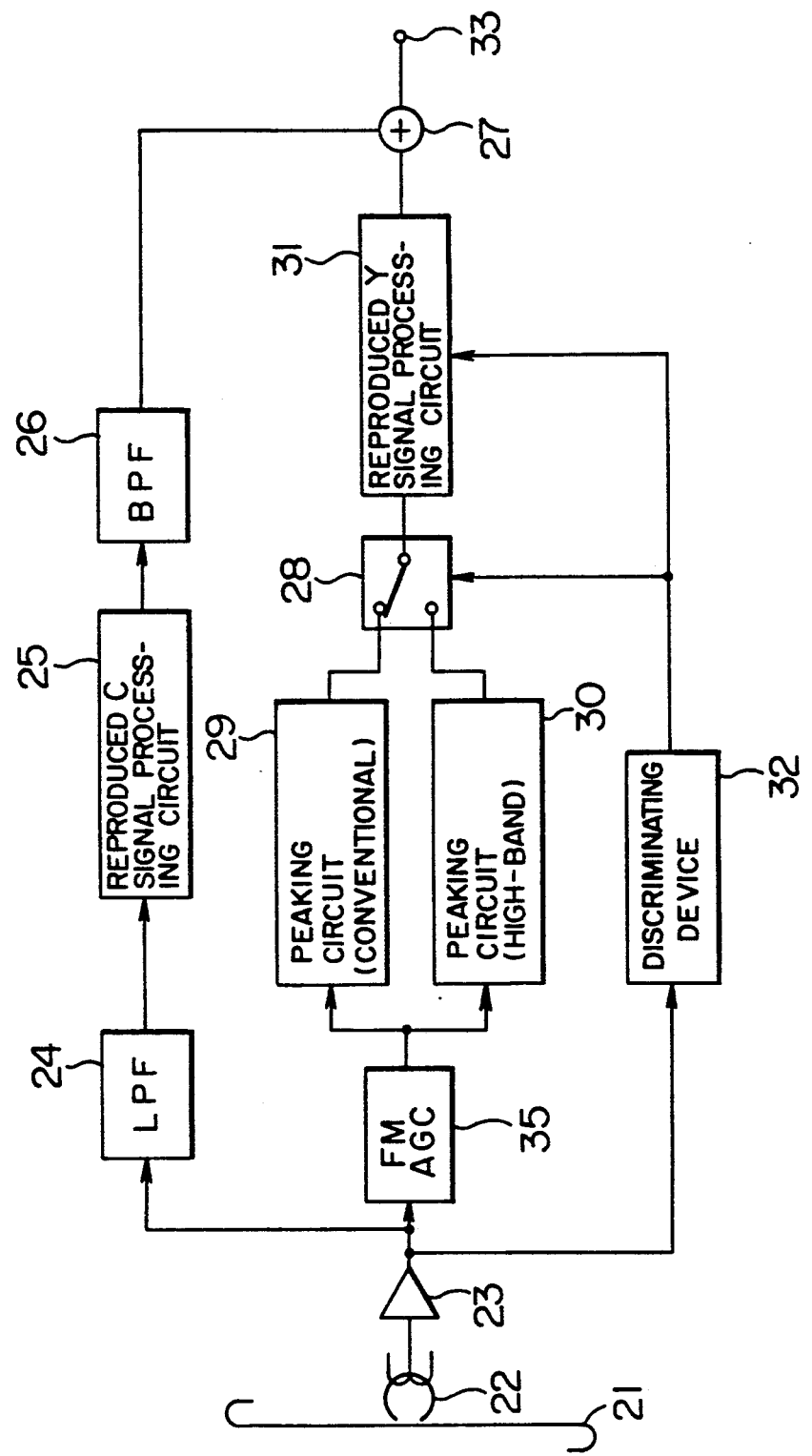
FIG. 1A is a block diagram showing the structure of a reproducing system of the VTR to which the present invention is applied as an embodiment.

In the VTR reproducing system of FIG. 1A, 21 denotes a magnetic tape, 22 a magnetic head, 23 a preamplifier, 24 a low-pass filter (LPF) for extracting a C component only from a reproduced signal picked up from the head 22, 25 a reproduced C signal processing circuit for restoring the frequency of the subcarrier to the original frequency of 3.58 MHz, 26 a band-pass filter (BPF), 27 an adder, 28 a switch, 29 a first peaking circuit for the conventional recording method, having a frequency characteristic curve with a peak frequency of 4.4 MHz, 30 a second peaking circuit for the high-band recording method, having a frequency characteristic with a peak frequency of 7.0 MHz, 31 a reproduced Y signal processing circuit including such as an FM demodulator circuit, a de-emphasis circuit, whose characteristics are changed over in accordance with the output of a discriminating device 32, 33 an output terminal at which an original video signal appears in a form of the Y signal and the C signal multiplexed by the adder 27.

An FM AGC circuit 35 is provided at the preceding stage of the first and second peaking circuits 29 and 30 and the output of the preamplifier 23 is applied to each of the LPF 24, the discriminating device 32 and the FM AGC circuit 35. The recording method of the reproduced video signal is identified on the basis of the output of the discriminating device 32 and a signal indicative of the result of identification is applied to the switch 28 to allow switching of the outputs of the first and second peaking circuits 29 and 30 in accordance with the type of recording method thus identified.

Figure 1B:
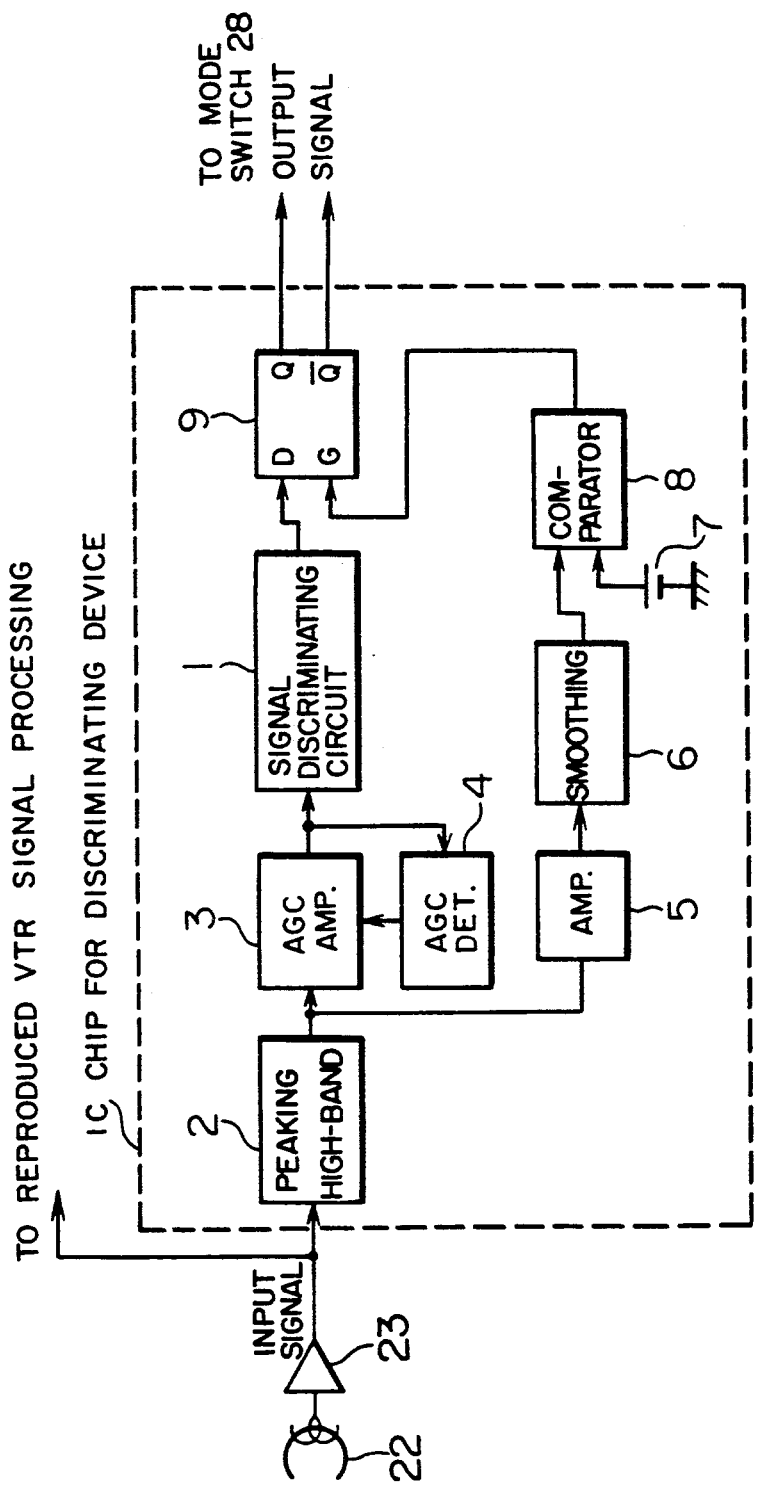
FIG. 1B is a block diagram schematically showing a discriminating device of an embodiment according to the present invention.
Figure 2:
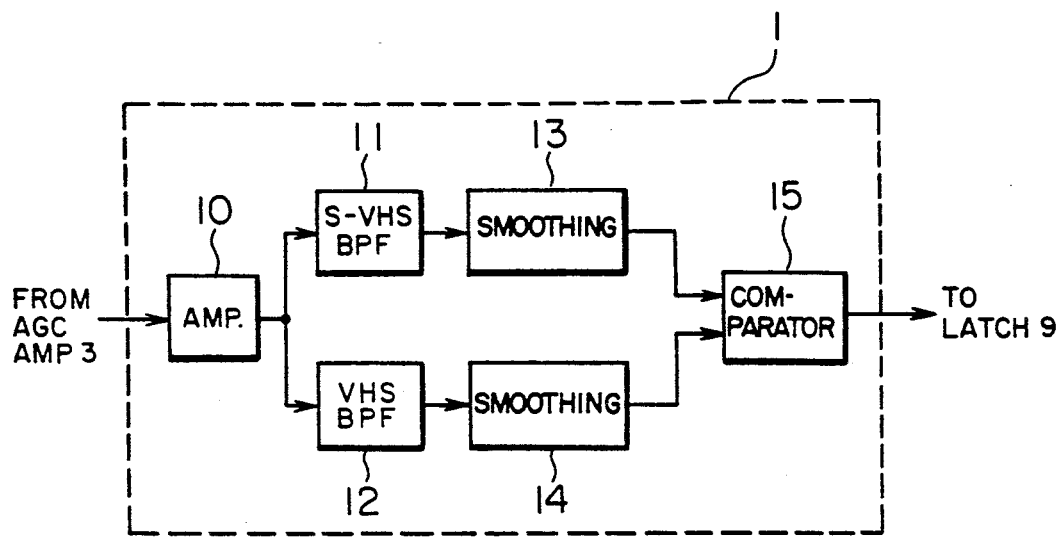
FIG. 2 is a block diagram showing in detail an example of a signal discriminating circuit 1 of FIG. 1B.
Figure 3:
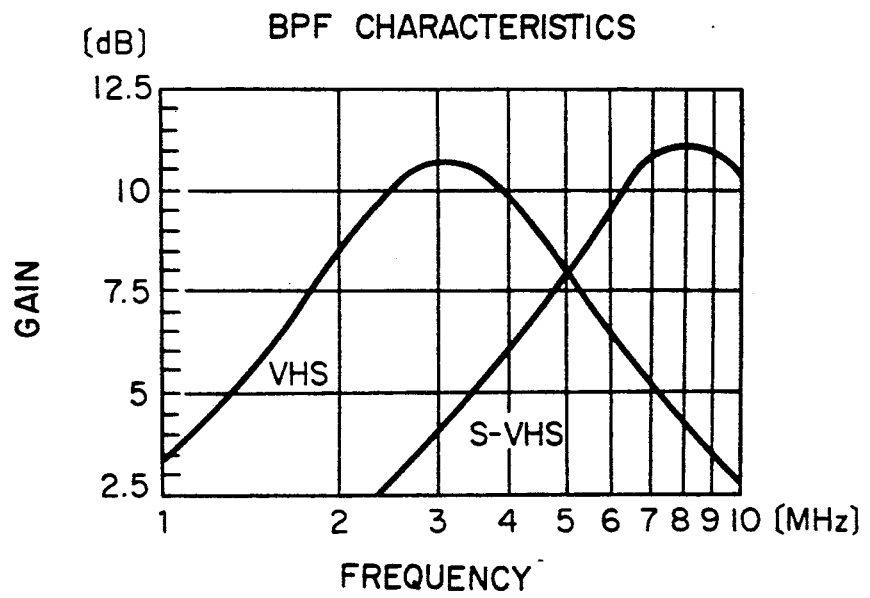
FIG. 3 is a graph showing characteristics of an S-VHS-BPF 11 and a VHS-BPF 12 of FIG. 2.
Figure 7:
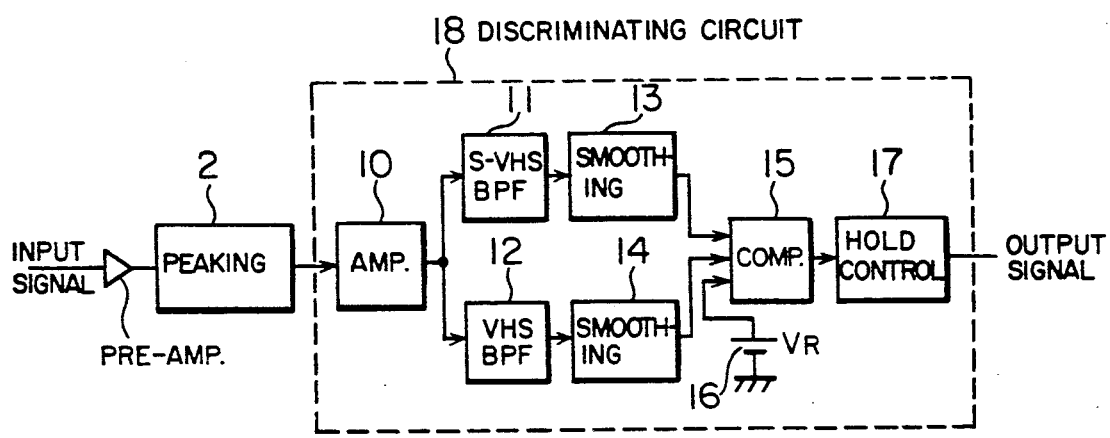
FIG. 7 is a schematic block diagram showing an example of the conventional discriminating device.

FIG. 1B is a block diagram of a signal discriminating device showing an embodiment according to the present invention. This configuration includes a signal discriminating circuit 1, a peaking circuit 2, an automatic gain control amplifier 3 (to be referred to as an AGC amplifier herebelow) as a constituent element of an AGC circuit, a level detecting circuit 4 (to be referred to as an AGC detecting circuit herebelow) as a constituent element of an AGC circuit, an amplifier 5, a smoothing circuit 6, a reference voltage generating circuit 7, a comparator 8, and a latch circuit 9. Furthermore, FIG. 2 shows in detail an example of the constituent elements of the signal discriminating circuit 1 of FIG. 1 in which reference numerals 10 to 15 indicate elements functioning to provide similar operations as those of the conventional example of FIG. 7. The reference voltage generating circuit 7 is however unnecessary. In the signal discriminating section 1, when the amplifier 10 is supplied with a reproduced FM output signal obtained by reproducing a signal recorded in either one of the FM standards, namely, the VHS or S-VHS mode, there is developed a function in which it is judged to determine whether the FM standard of the input signal is the VHS mode or the S-VHS mode so as to produce change-over control signals to effect a switching operation on the reproducing (playback circuit) system and to turn a mode indication light emitting diode on.

Figure 4:
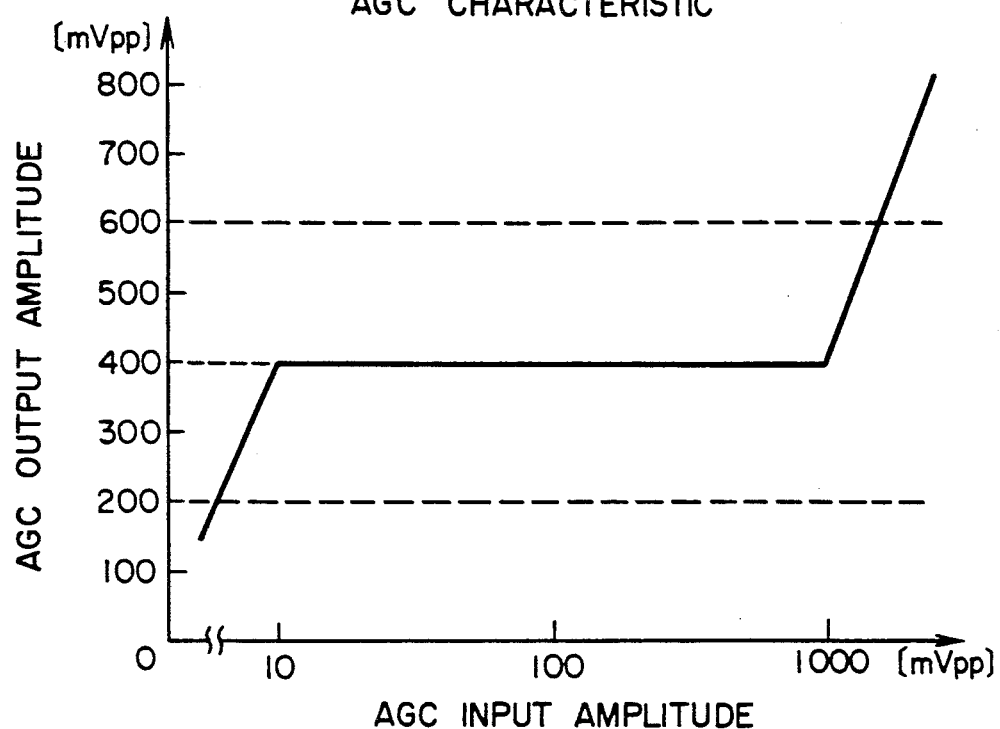
FIG. 4 is a graph showing a characteristic of an AGC circuit of FIG. 1B.
Figure 8:
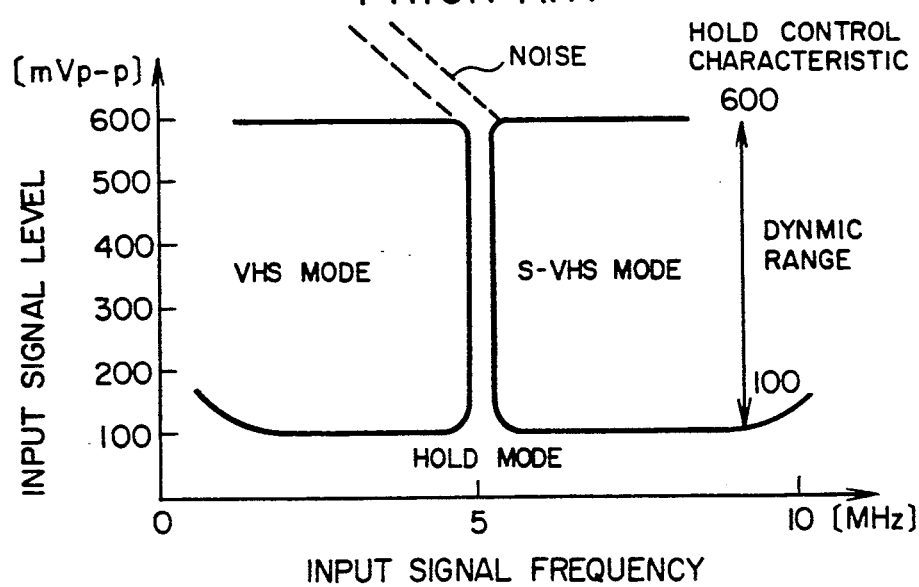
FIG. 8 is a graph showing characteristics associated with the VHS and S-VHS modes.

FIG. 8 shows an example of a characteristic of the signal discriminating circuit 1 wherein the input signal level for which the discrimination can be achieved is in a range from 100 mVpp to 600 mVpp. As shown in the example of FIG. 8, even when the signal discriminating circuit is configured in any circuit form, due to restrictions associated with the dynamic ranges respectively of the internal circuits or the like, there exists a dynamic range of an input signal in which the discrimination is possible. Consequently, in order to expand the dynamic range, the system of FIG. 1 is provided with an AGC circuit including the AGC amplifier 3 and the AGC detecting circuit 4. FIG. 4 shows an example of an input/output characteristic of the AGC circuit 3 and 4. When the amplitude of the input signal supplied to the AGC amplifier 3 is in a range from about 10 mVpp to about 1 Vpp, the output amplitude is substantially constant, namely, 400 mVpp. The discrimination characteristic of the signal discriminating circuit 1 is as shown in FIG. 8, and hence the amplitude of 400 mVpp is quite suitable for the discrimination. In consequence, as a result of provision of the AGC circuit 3 and 4 above, the signal discrimination is possible when the amplitude of the signal inputted to the AGC circuit 3 is in a range from 10 mVpp to 1 Vpp.

In a practical operation, however, when the gain of the reproducing preamplifier is set to about 66 dB, the signal-to-noise ratio (to be abbreviated as S/N ratio herebelow) is greatly deteriorated for a signal of which the output amplitude is about 50 mVpp or less, and hence this signal is not suitable as input information for the discriminating circuit, namely, there exists a danger that an incorrect discrimination easily takes place. Actually, even in a case where a playback operation is conducted on a tape not undergone a recording operation, the reproducing preamplifier delivers an output attended with a noise associated with an amplitude of 50 mVpp. As means to solve this problem, the configuration of FIG. 1 includes the amplifier 5, the smoothing circuit 6, the reference voltage generating section 7, the comparator 8, and the latch circuit 9. Description will next be given of operations of these elements.

The amplifier 5 is supplied as an input thereto a signal which has not passed the AGC circuit 3. The amplifier 5 delivers an output which is converted into a DC signal through the smoothing circuit 6 so as to be supplied to the comparator 8. The comparator 8 then compares an output from the smoothing circuit 6 with an output from the reference voltage generating circuit 7 which supplies a comparison reference, thereby outputting a signal at a high level or a low level depending on the result of the comparison. The amplifier 5 is disposed to facilitate the compare operation and hence is not necessarily included in this configuration. Let us consider an example in which the gain and the reference voltage 7 are set for the amplifier 5 such that the output from the comparator 8 is respectively set to the high level and the low level when the amplitude of the input signal supplied to the amplifier 5 is at least 100 mVpp and less than 100 mVpp, respectively. The comparator 8 delivers an output to be fed to the latch circuit 9 including a flip-flop circuit. Table 1 shows a truth value table of the latch 9.

TABLE 1

| G | Q | $\bar{Q}$ |
|---|---|---|
| 1 | D | $\bar{D}$ |
| Q | Latch | |

In Table 1, digits 1 and 0 assigned for the G input indicate the high level and the low level, respectively. That is, when the amplitude of the input signal supplied to the amplifier 5 is at least 100 mVpp, the output Q from the latch circuit 9 delivers the discrimination output directly from the signal discrimination circuit 1. In this situation, for the input signal supplied to the signal discriminating circuit 1, the S/N ratio is favorable and the amplitude is kept at 400 mVpp, which facilitates the stable discriminating operation. In addition, when the amplitude of the input signal fed to the amplifier 5 is smaller than 100 mVpp, for the output Q from the latch circuit 9, the previous output value is kept unchanged (latched state).

In consequence, even when the signal discriminating circuit 1 causes a misoperation or an incorrect operation due to a signal with a deteriorated S/N ratio, for the output from the latch circuit 9, a discrimination output obtained when the S/N ratio is favorable is held, and hence such an erroneous operation cannot be achieved.

Figure 5:
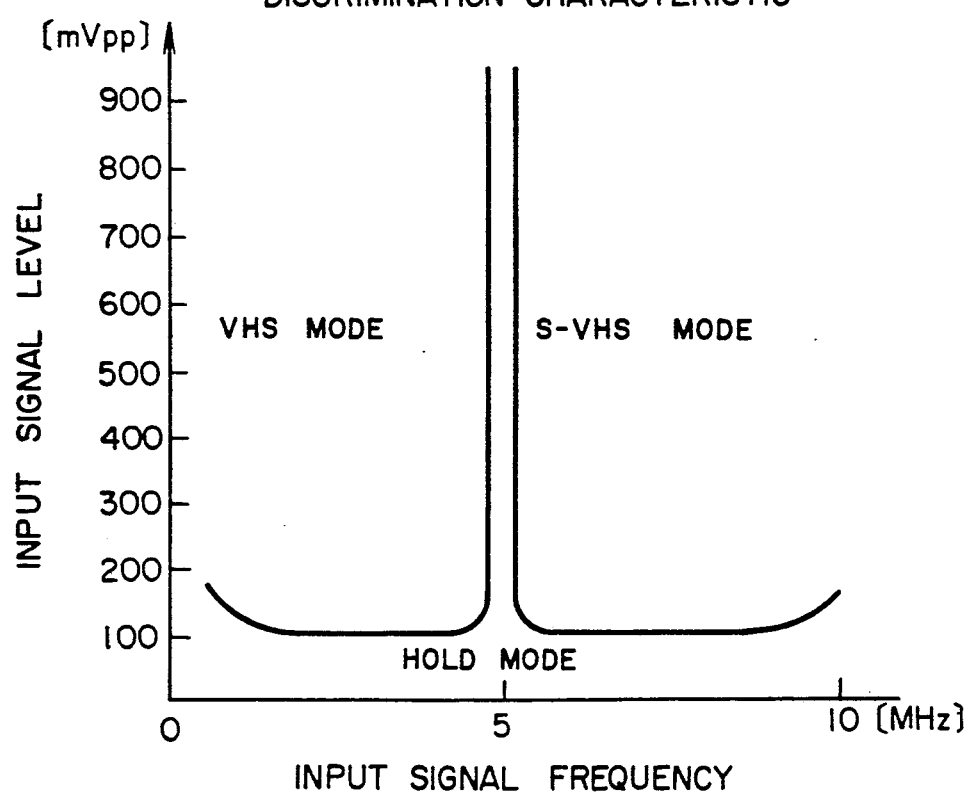
FIG. 5 is a graph showing an example of a characteristic of a signal discrimination of the system of FIG. 1B according to the present invention.

FIG. 5 shows an example of the discrimination characteristic of the circuit configuration of FIG. 1 described above. In association with the AGC characteristic of FIG. 4, the upper limit of the dynamic range is expanded to exceed the input amplitude of 1 Vpp and there is provided the latch operation above; in consequence, in the range of the input amplitude not exceeding 100 mVpp related to noise, the hold mode is set to hold the previous value of the discrimination output..

Figure 6A:
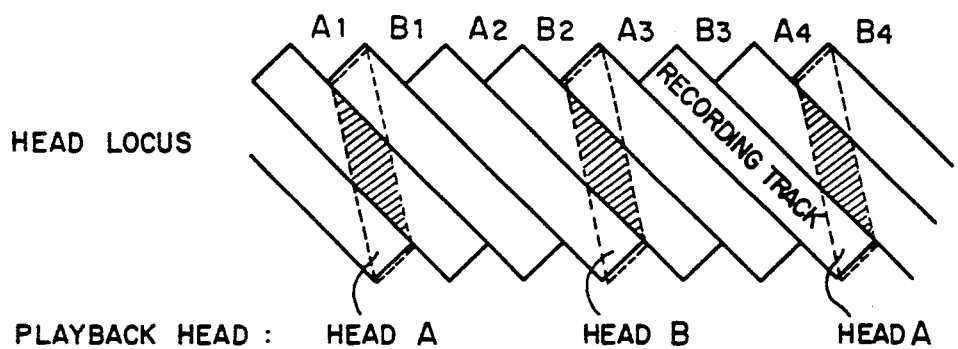
FIGS. 6A and 6B respectively are a head locus diagram and a reproduced output envelope diagram showing an operation in the case where the present invention is applied to a special playback (reproducing) operation of a VTR.
Figure 6B:
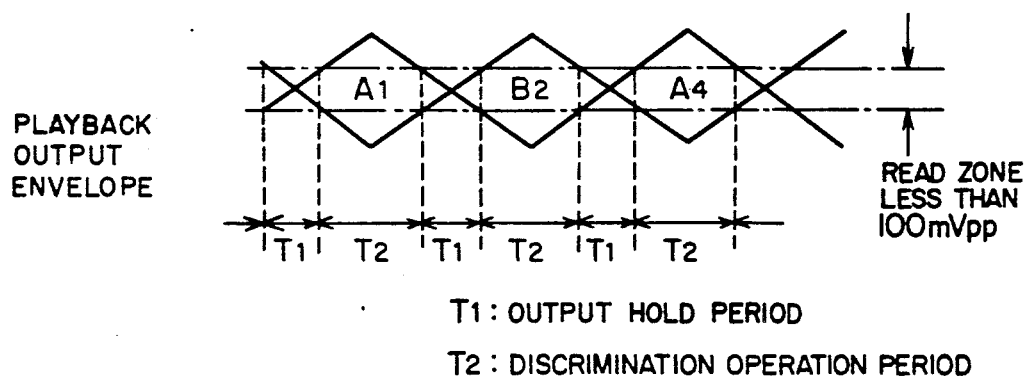

FIGS. 6A and 6B are diagrams showing a special operation of the VTR such as a search operation or a still operation to which the present invention is effectively applied wherein FIG. 6A shows the head locus and FIG. 6B shows the reproduced output envelope.

As can be seen from the example of FIG. 6A, the locus of the head in a special playback operation, a trace operation is generally achieved in a range including two or more tracks. In the recording track, a portion of $A_n$ is recorded in a state where the azimuth of the track is identical to that of a head A, whereas a portion of $B_n$ is recorded with the track azimuth equal to that of a head B, where n = 1, 2, 3, 4, etc. The azimuth of the head A is different from that of the head B, and hence the reproduced output envelope develops a change in which the amplitude is increased and decreased in an alternate fashion as shown in FIG. 6B. In the case where the recording track has an azimuth equal to the azimuth of the playback head, a large value is obtained for the reproduced or playback output envelope and a favorable S/N ratio is developed. Furthermore, when the recording track has an azimuth unequal to the azimuth of the playback head, a small value is obtained for the playback output envelope and a deteriorated S/N ratio is developed. According to the present invention it is possible to effect a hold operation to hold the previous value of the discrimination output under a condition in which a range of the amplitude associated with the reproduced output envelope is below 100 mVpp is set as the dead zone (FIG. 6B). That is, the signal discrimination is carried out only in a period $T_2$ in which the S/N ratio is favorable, whereas there is effected an operation to hold the output in a period $T_1$ in which the S/N ratio is deteriorated. In consequence, the erroneous operation is prevented also in the special playback operation. In order to manufacture the discriminating device in a form of an integrated circuit, the band-pass filters 11 and 12 are configured with active filters, and a capacitor and a resistor included in a time constant circuit which is conventionally provided as an external device and which is disposed for the purpose of adjusting the characteristic of said filters 11 and 12 are constituted with variable capacitance elements, so that the time constant is adjusted by externally applying a voltage thereto.

While the particular embodiments of the invention have been shown and described, it will be obvious to those skilled in the art that various changes and modifications may be made without departing from the present invention in its broader aspects.

We claim:

1. A signal discriminating device having a discriminating circuit which detects a difference between frequency spectra of input signals so as to classify the input signals in association with at least two different recording modes comprising:
   an automatic gain control (AGC) circuit connected to receive the input signals thereto as an input and to supply an output therefrom to said discriminating circuit;
   an amplitude detecting circuit for detecting an amplitude of said input signal supplied to said signal discriminating device; and
   a hold circuit connected to an output from said discriminating circuit for holding a discrimination output therefrom depending on the output of said detecting circuit wherein:
   when an amplitude of the input signal supplied to said AGC circuit is greater than a predetermined threshold value, the output from said signal discriminating circuit is delivered as an output from the device and
   when an amplitude of the input signal supplied to said AGC circuit is smaller than the predetermined threshold value, a previous value of the output of said signal discriminating circuit is kept unchanged by said hold circuit and is delivered as the output of the device.

2. A signal discriminating device according to claim 1 wherein at the preceding stage of said AGC circuit and said amplitude detecting circuit, a peaking circuit for effecting a peaking on the input signals is connected.

3. A signal discriminating device according to claim 2 wherein said hold circuit receives as a data input a digital output from said discriminating circuit and receives as a control input a digital output from said amplitude detecting circuit,
   said hold circuit includes a flip-flop circuit such that two complementary outputs therefrom are provided as respective mode discriminating signals.

4. A signal discriminating apparatus according to claim 3 wherein said amplitude detecting circuit includes:
   a smoothing circuit for smoothing an output from said peaking circuit so as to convert the output into a DC voltage and;
   a comparator circuit for comparing an output from said smoothing circuit with a voltage of a reference voltage being source, said voltage equal to a maximum value of noise information.

5. A magnetic recording and reproducing apparatus including a recording system operable with a first and a second recording mode converting a luminance signal of a video signal into an FM luminance signal having a first and a second carrier frequency respectively and recording the FM luminance signal on a magnetic recording medium, and a reproducing system reproducing the FM luminance signal recorded on the magnetic recording medium, said apparatus comprising:
   discriminating means disposed in said reproducing system for receiving said FM luminance signal reproduced from said magnetic recording medium and discriminating as to whether said reproduced FM luminance signal was recorded according to said first recording mode or said second recording mode;
   first signal processing means disposed in said reproducing system for processing said reproduced FM luminance signal recorded according to said first recording mode;
   second signal processing means disposed in said reproducing system for processing and FM luminance signal recorded according to said second recording mode; and
   control means responsive to an output of said discriminating means to control application of said reproduced FM luminance signal to one of said first and second signal processing means,
   said discriminating means including:
   a peaking circuit for compensating for lowering of a high-band signal gain caused in magnetic recording and reproduction;
   an AGC circuit for automatically adjusting a gain of an output from said peaking circuit;
   a discriminating circuit for receiving an output signal from said AGC circuit so as to obtain a difference between frequency spectra of said signal by use of band-pass filters respectively corresponding to the first and second recording modes, thereby discriminating a mode associated with said FM luminance signal;
   a noise identifying circuit to which an output from said peaking circuit is supplied in a parallel fashion with respect to said AGC circuit so as to detect an amplitude of the supplied signal such that a detected value is compared with a reference voltage source of a voltage equal to an allowance limit of a noise voltage, thereby producing a noise identifying signal to indicate whether or not the input reproduced signal is a noise; and
   a latch circuit for receiving as a data input an output from said signal discriminating circuit and as a control input the noise identifying signal from said noise identifying circuit so as to produce an output as a discrimination output of said discriminating means wherein when an amplitude of the output signal from said peaking circuit is greater than a threshold value representing the noise allowance limit, said latch circuit releases a latched state thereof and when the amplitude of the output signal from said peaking circuit is smaller than the threshold value, said latch circuit latches a previous value thereof.

6. A magnetic recording and reproducing apparatus according to claim 5 wherein:

said latch circuit includes a flip-flop circuit; and
said discriminating means is formed in an integrated circuit chip.

7. A signal discriminating device according to claim 1, wherein the predetermined threshold value is set for enabling holding an amplitude level in a range by said discriminating circuit so that said AGC circuit maintains an output amplitude thereof unchanged.

8. A signal discriminating device having a discriminating circuit which detects a difference between frequency spectra of input signals so as to classify the input signals in association with at least two different recording modes comprising:

an automatic gain control (AGC) circuit connected to receive the input signals thereto as an input and to supply an output therefrom to said discriminating circuit;

an amplitude detecting circuit for detecting an amplitude of said input signal supplied to said signal discriminating device; and a hold circuit connected to an output from said discriminating circuit for holding a discrimination output therefrom depending on a reference voltage supplied from said amplitude detecting circuit, said reference voltage being equal to a maximum value of noise information, whereby:

when an amplitude of the input signal supplied to said AGC circuit is greater than a predetermined threshold value, the output from said signal discriminating circuit is delivered as an output from the device; and when an amplitude of the input signal supplied to said AGC circuit is smaller than the predetermined threshold value, a previous value of the output of said signal discriminating circuit is kept unchanged by said hold circuit and is delivered as the output of the device.

* * * * *